R. HARDEN.
DEVICE FOR STRINGING CORN.
APPLICATION FILED JAN. 29, 1914.
1,135,791.
Patented Apr. 13, 1915.
3 SHEETS—SHEET 1.
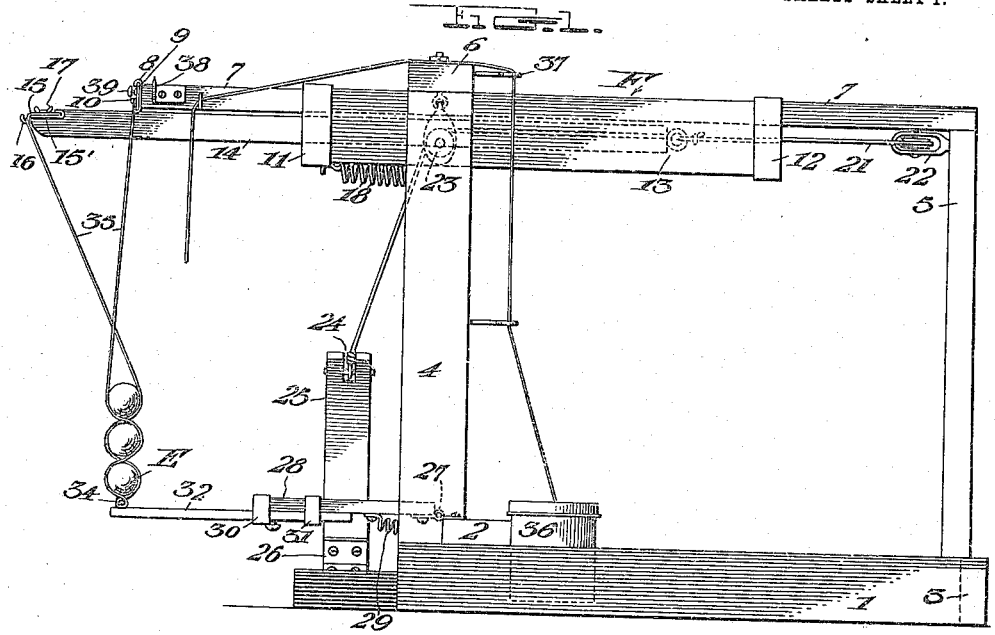
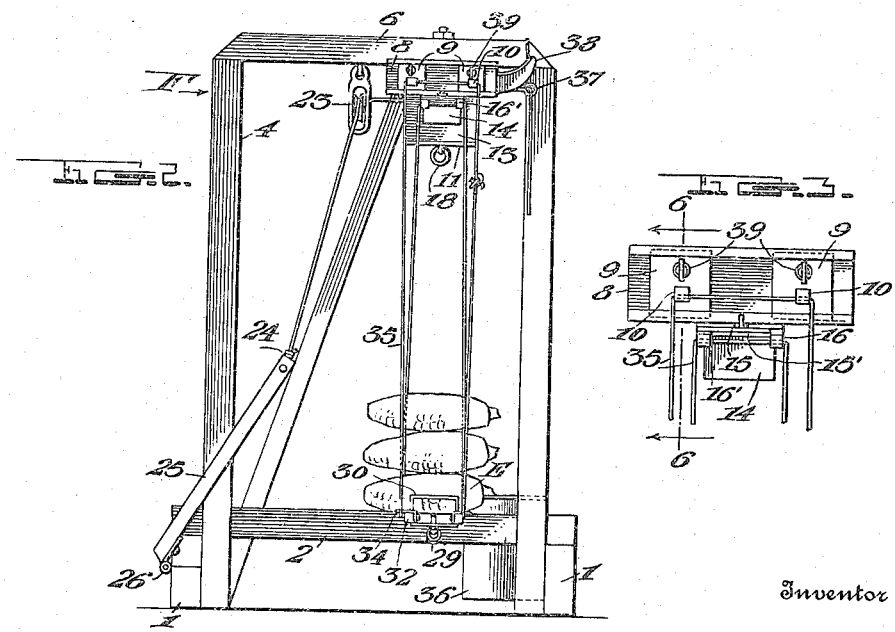
Witnesses
F. Woodard
C. Clemitson
Inventor
Ray Harden
By H. B. Willson
Attorneys

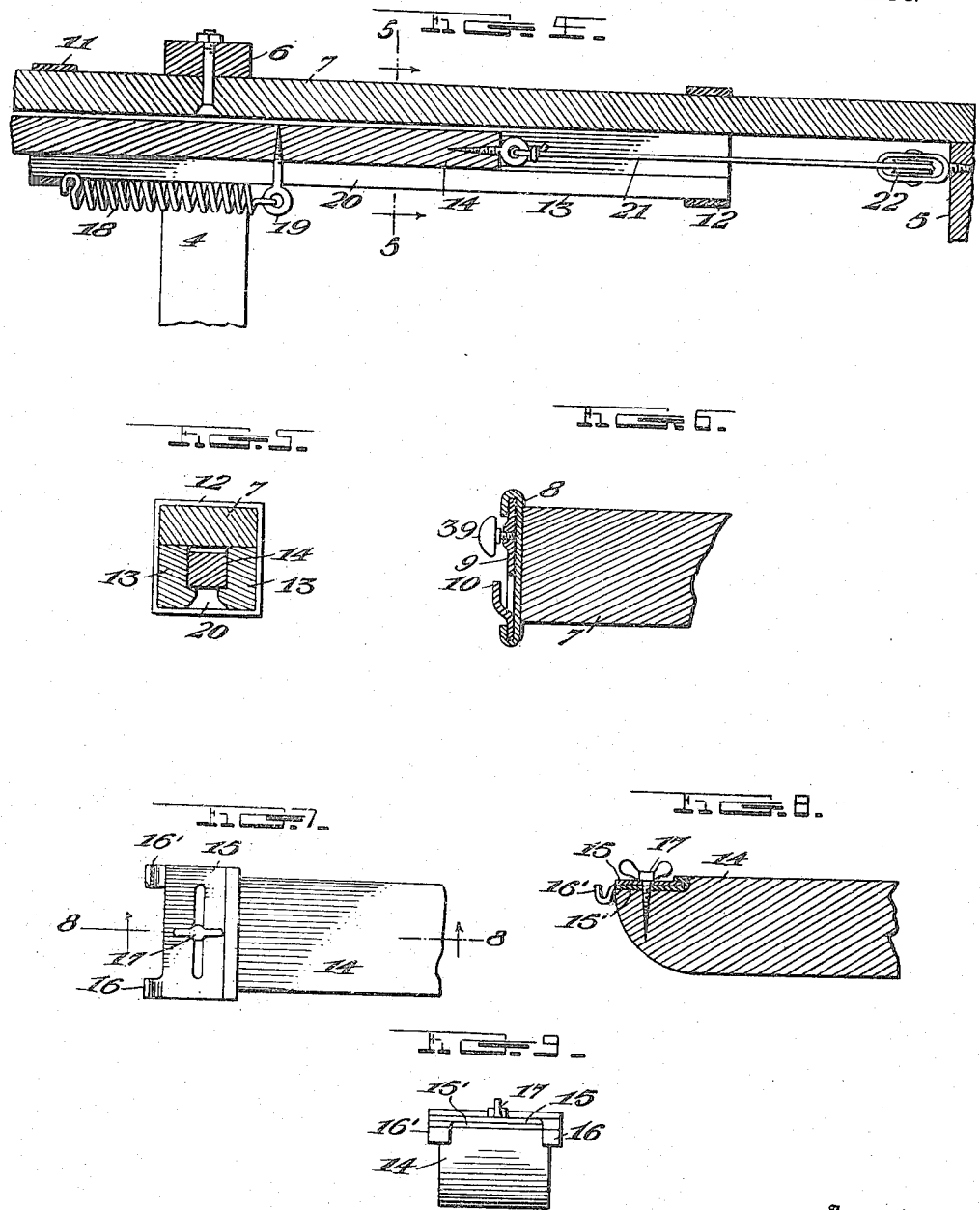

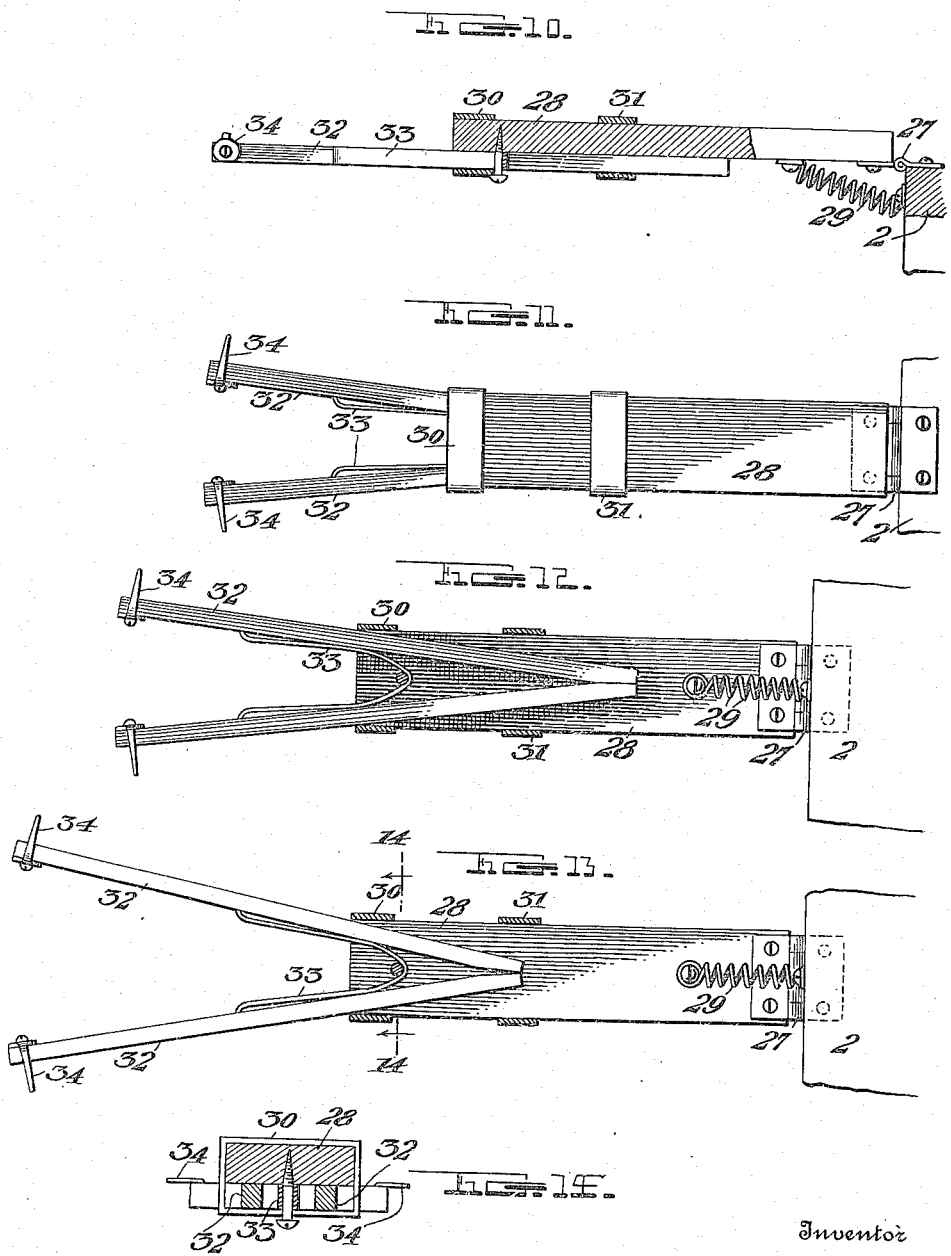

UNITED STATES PATENT OFFICE.

RAY HARDEN, OF LANE, SOUTH DAKOTA.

DEVICE FOR STRINGING CORN.

1,135,791. Specification of Letters Patent. Patented Apr. 13, 1915.

Application filed January 29, 1914. Serial No. 815,240.

*To all whom it may concern:*

Be it known that I, RAY HARDEN, a citizen of the United States, residing at Lane, in the county of Jerauld and State of South Dakota, have invented certain new and useful Improvements in Devices for Stringing Corn; and I do declare the following to be a full, clear, and exact description of the invention, such as will enable others skilled in the art to which it appertains to make and use the same.

This invention relates to improvements in machines for stringing seed corn for the purpose of allowing the same to dry and the primary object of the invention is to provide a device of this character having simply constructed means for performing its work through the action of a foot treadle.

A secondary object is to construct certain parts of the machine in such a manner as to render the strands of twine upon which the corn is being strung adjustable toward or away from each other, according to the length of the ears of corn.

With the above objects in view, the invention resides in certain novel features of construction and combination herein described and claimed and shown in the drawings wherein:

Figure 1 is a side elevation of my improved machine showing its manner of operation; Fig. 2 is an end view thereof; Fig. 3 is an enlarged end view of a portion thereof; Fig. 4 is a longitudinal section through the upper part of the machine; Fig. 5 is a transverse section on the line 5—5 of Fig. 4; Fig. 6 is a detail vertical section on the line 6—6 of Fig. 3; Fig. 7 is a plan view of the forward end of the plunger; Fig. 8 is a vertical section thereof on the line 8—8 of Fig. 7; Fig. 9 is an end view of the plunger; Fig. 10 is a side elevation partly in section of the tensioning arm; Fig. 11 is a top plan view thereof; Fig. 12 is a bottom view of said arm partly in section; Fig. 13 is a similar view showing a different position of parts; and Fig. 14 is a transverse section on the line 14—14 of Fig. 13.

In the embodiment illustrated, I have shown a supporting frame F comprising longitudinal base bars 1, front and rear cross bars 2 and 3 connecting said longitudinal bars, front and rear standards 4 and 5 rising respectively from the longitudinal bars 1 and from the rear cross bar 3, the front standards 4 being connected at their upper ends by a cross bar 6.

Rigidly secured to the cross bar 6 and to the rear standard 5, is a longitudinally extending bar 7 which projects a suitable distance beyond said cross bar 6 and is provided with a laterally extending guide 8 in which is slidably mounted a pair of plates 9 carrying twine supporting hooks 10 for a purpose to appear. Front and rear yokes 11 and 12 depend from the longitudinal bar 7 and support a suitable guideway 13 in which is slidably mounted a plunger 14 which normally projects a suitable distance beyond the forward end of the bar 7 and is provided with a pair of slotted plates 15 and 15' which carry hooks 16 and 16', a screw 17 passing through the slots in said plates and into the end of the plunger 14. The hooks 16 and 16' coact with the hooks 10 in a manner to be hereinafter set forth.

The plunger 14 is normally held in projected position by means of a coil spring 18 which is secured at one end to the front yoke 11, its opposite end being secured in an eye 19 which slides through a slot 20 in the lower side of the guideway 13. For retracting the plunger 14 at proper intervals, I provide a flexible cable 21 which is connected to the rear end of said plunger, passes around a guide pulley 22 which is secured to the rear standard 3, then extends forwardly over a similar pulley 23, depending from the cross bar 6 and is connected at 24 to a foot treadle 25 which is hinged as at 26 to the forward end of one of the longitudinal bars 1.

Hingedly connected as at 27 to the front cross bar 2 of the frame F is a longitudinally projecting arm 28 which is normally pulled downward by a coil spring 29 secured to said arm and to the bar 2. The arm 28 is provided with front and rear yokes 30 and 31 in which a pair of longitudinally projecting fingers 32 is mounted to slide. The outer sides of the fingers 32 are normally held in contact with the front yoke 30 and the rear ends of said fingers are held in contact with each other by means of a U-shaped spring 33 which is slidable within said front yoke, its free ends being bent outwardly and bearing against the inner sides of said fingers. The forward ends of the fingers 32 are provided with outwardly extending hooks 34 around which and the hooks 10, 16 and 16', passes a loop of twine 35 formed by uniting the opposite ends of said twine. The loop 35 is disposed upon the various hooks in such a manner as to provide a substantially V-shaped loop on each side of the machine.

I preferably, though not necessarily, provide a twine box 36 which is secured in any suitable manner to a suitable part of the frame F, the twine passing from said box being laid through suitable guides 37, the forward one of which is disposed in close proximity to the other end of the longitudinal bar 7, a suitable knife 38 being provided near said guide for the purpose of cutting the twine when necessary.

I have described my invention as employing a supporting frame, but it will be evident that any other suitable form of support might be employed for the guideway 13 and the uppermost parts of the machine.

By the specific mounting of the arm 28 and the fingers 32, the tension of the spring 29, normally pulling down on said arm, will exert a proper amount of tension upon the various strands of the loop 35 thus retaining said strands always in proper position.

The operation of the device is as follows: With the parts in normal position and with the loop 35 applied in the manner above described, an ear of corn E may be placed between the various strands of said loop and allowed to rest upon the upper faces of the hooks 34. After this operation, the foot treadle 25 is depressed. This will, through the action of the cable 21, retract the plunger 14 which will carry with it the strands of the loop 35 which formerly stood toward the front of the machine. This operation will in other words, cross the pairs of strands on each side of the machine whereupon a second ear may be placed over the first mentioned ear and the foot treadle released thus allowing the spring 18 to again project the plunger 15. The above operation may be continued successively until the proper number of ears have been strung up whereupon, the loop 35 may be removed from the various hooks and hung in any suitable place to allow the corn to dry.

From the construction and mounting of the arm 28 and the fingers 32, it will be readily seen that by forcing said fingers inwardly or outwardly, the distance between the hooks, at the ends thereof, may be varied. It will also be noted that the hooks 10, 16 and 16' may be adjusted toward or away from each other. These provisions are made in order to readily adapt the machine to stringing ears of different lengths, it being understood that when long ears are being strung, the various hooks are spaced considerable distances apart thus bringing the various strands of twine, on the opposite sides of the machine, to suitable points in respect to the ends of said ears.

Any suitable means may be employed for fastening the plates 9 and their hooks 10 in adjusted position, but I preferably provide thumb screws 39 which pass through said plates and bear against the guide plate 8. The screw 17 is also preferably in the form of a thumb screw thus rendering the parts readily adjustable without the necessity of employing any tools whatever.

Although I have described my invention with considerable minuteness, I do not wish to be limited to details of construction other than those amplified in the appended claims.

Having thus described my invention, what I claim as new and desire to secure by Letters Patent is:—

1. A seed corn stringer comprising a relatively fixed supporting member having a pair of twine supporting hooks adjustable one toward the other, and a relatively movable supporting member likewise having a pair of twine supporting hooks adjustable one toward the other.

2. A seed corn stringer comprising a relatively fixed support, a relatively movable support, guides carried by said fixed and movable supports, plates slidable in said guides and having twine supporting hooks, and means whereby said plates may be locked against movement in said guides.

3. A seed corn stringer comprising mechanism for supporting a plurality of strands of twine in variable spaced relation and for intermittently crossing said strands, a number of downwardly pressed fingers engaged with said strands below said supporting mechanism said fingers being mounted for variable spaced relation, and means for retaining them in adjusted position.

4. A seed corn stringer comprising mechanism for supporting a plurality of strands of twine in variable spaced relation and for intermittently crossing said strands, a number of downwardly pressed fingers engaged with said strands below said supporting mechanism, said fingers being mounted for variable spaced relation, means for retaining them in adjusted position, a support below said twine supporting and crossing mechanism, a guide on said support, a pair of twine engaging fingers mounted in said guide and projecting forwardly and rearwardly therefrom and a spring for holding said fingers in contact with the sides of said guide and for retaining said fingers in variable spaced relation.

5. A seed corn stringer comprising mechanism for supporting a plurality of strands of twine in variable spaced relation and for intermittently crossing said strands, a number of downwardly pressed fingers engaged with said strands below said supporting mechanism, said fingers being mounted for variable spaced relation, means for retaining said finger in adjusted position, a support below said twine supporting and crossing mechanism, a yoke on said support, a pair of twine engaging fingers mounted in said yoke and projecting forwardly and rearwardly therefrom and a spring for normally holding the rear ends of said fingers in contact with each other and for holding said fingers in contact with the sides of said yoke.

6. A seed corn stringer comprising a substantially horizontal guide having a pair of twine supporting hooks adjustable toward and away from each other, a plunger slidable within said guide and having twine supporting hooks on one end adjustable toward and away from each other, means for reciprocating said plunger and a set of twine tensioning hooks below said plunger and adjustable toward and away from each other, for the purpose set forth.

In testimony whereof I have hereunto set my hand in presence of two subscribing witnesses.

RAY HARDEN.

Witnesses:
CHAS. R. HATCH,
E. E. DYKEMAN.

Copies of this patent may be obtained for five cents each, by addressing the "Commissioner of Patents, Washington, D. C."